Dec. 10, 1968   H. STAMPFLI   3,415,284
FLAP VALVE

Filed Oct. 26, 1966   3 Sheets-Sheet 1

INVENTOR
HARALD STAMPFLI
BY Emory G. Groff Jr.
ATTORNEY

United States Patent Office 3,415,284
Patented Dec. 10, 1968

3,415,284
FLAP VALVE
Harald Stampfli, Petit-Saconnex, Switzerland, assignor to Lucifer S.A., Chemin Lucifer (Rondeau), Carouge-Geneva, Switzerland, a company of Switzerland
Filed Oct. 26, 1966, Ser. No. 589,735
Claims priority, application Switzerland, Nov. 11, 1965, 15,548
6 Claims. (Cl. 137—625.66)

The present invention has for its object a valve including at least two flaps fitted on a movable member, so that one of them may be in its closed position when the other is in its open position and conversely.

In such valves, a fluid-tight packing is secured to the flap, or else to the seat of the flap, so that the closing of the passage through the valve is obtained only when the flap enters its closed position. The result is that, during the closing movement, both flaps are spaced away from their seats, which provides a generally undesirable connection between the different ways controlled by the valve. In those applications where such a transient connection cannot be allowed, it was generally necessary to give up the use of such flap valves and to resort to slide valves.

The present invention has for its object to cut out such a drawback and it covers a valve of the type referred to which associates with each flap an intermediate yielding part adapted to be clamped between each flap and the corresponding seat, said part engaging the flap and the corresponding seat before the end of the closing stroke of the flap considered, whereby the passage between the seat and its flap is closed, said yielding part being elastically deformed as soon as it enters into contact with the cooperating flap and seat and continuing being deformed until the closing stroke of the valve considered is at an end.

The accompanying drawings illustrate by way of example three embodiments of said improved valve. In said drawings.

Figure 1:
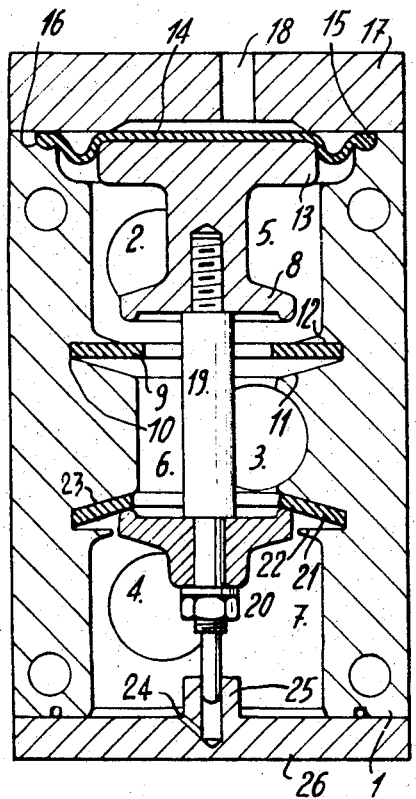
FIG. 1 illustrates a first embodiment of the improved flap provided with two flaps, one flap being shown in its closed position and the other in its open position.
Figure 2:
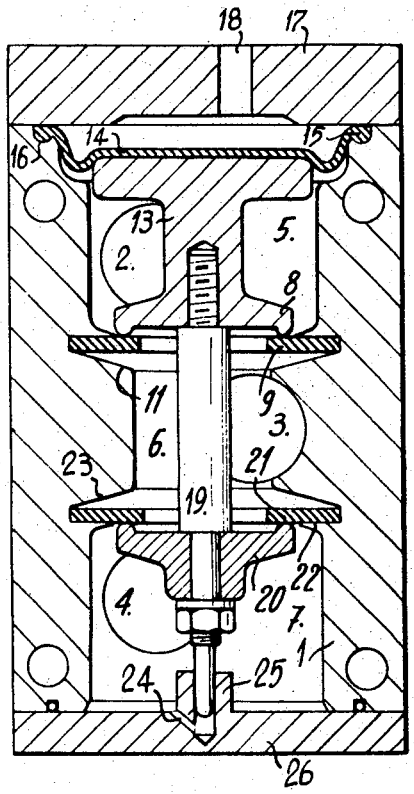
FIG. 2 shows the same valve, both flaps of which are shown in an intermediate position.

The valve illustrated in FIGS. 1 and 2 is a three-way distributing valve. It includes a body or shell 1 provided with three ports 2, 3 and 4 for the fluid inlet or outlet, leading respectively into the chambers 5, 6 and 7 formed in said shell 1. The passage between the chambers 5 and 6 is controlled by a flap 8 cooperating with a washer 9 of an elastomer or the like elastic material inserted in an annular housing 10 formed in the shell 1. Said housing 10 is bounded by a frustoconical surface 11 forming the seat of the flap and by a flat annular surface 12 forming an abutment surface for the washer 9 with a view to limiting the maximum spacing between the latter and the seat 11.

The flap 8 is in one with the core 13 carrying a diaphragm 14 the outer periphery 15 of which is fitted inside a groove 16 formed in the shell 1, said diaphragm being clamped in said groove by a cover 17 provided with a port 18 feeding the fluid adapted to shift the flap 8. A rod 19 is screwed into the core 13 to form the movable member of the valve and carries a second flap 20 cooperating with an elastic washer 21 similar to the washer 9 and adapted to be shifted, as in the case of the latter, between an abutment surface 22 and a frustoconical surface 23 forming the seat for said flap 20.

The lower end of the rod 19 is guided inside a blind bore 25 formed in a cover 26 closing the chamber 7, said cover being clamped in position against the shell 1 by means which are not illustrated. An oblique channel 24 provides a connection between the bore 25 and the chamber 7.

In the position illustrated in FIG. 1, a connection is provided between the chambers 5 and 6, while it is cut off between the chambers 6 and 7. The valve is held in said position by the pressure of the fluid prevailing in the chambers 5 and 6, which pressure acts on the core 13, the area subjected to pressure of which is larger than that of the flap 20. The washer 21 which is clamped between the flap 20 and the cooperating seat 23 provides for fluid tightness.

The controlling fluid under pressure fed through the port 18 produces a downward movement of the rod 19 and of the two flaps 8 and 20. At the beginning of said downward movement, the washer 21 has a tendency to assume a flat shape and it accompanies the flap 20 during its downward movement until said washer engages the abutment surfaces 22. In such a position, as illustrated in FIG. 2, the upper flap 8 also enters a position in contacting relationship with the washer 9 and consequently the connection with the chamber 6 is cut off, both with the chamber 5 and with the chamber 7.

As the flaps 8 and 20 continue moving downwardly, the flap 20 moves away from the washer 21, which establishes a connection between the chamber 6 and the chamber 7, whereas the flap 8 urges the washer 9 against the seat 11.

Through this arrangement, it is possible to cut out in a simple manner any transient interconnection between the several ways of a multiflap valve. It is obvious that, when such a connection appears, it leads to losses of fluid and consequently of pressure which are undesirable.

The drop in pressure, appearing at the moment when several chambers are interconnected by reason of the operation of the valve, often leads the producer to provide a special arrangement such as an oversized auxiliary control or else storage means adapted to supply the energy required, even during the periods during which the pressure or throughput of the fluid drops as a consequence of an interconnection between the different ways.

In the second embodiment, illustrated in FIGS. 3 and 4, the valve is very similar to that described with reference to FIGS. 1 and 2. The general arrangement being the same as that of the first embodiment, the same parts, shown again without any modification in FIGS. 3 and 4, carry the same reference numbers as precedingly. This is the case chiefly of the upper section of the valve including the flap 8 and of its lower section guiding the rod 19 inside the lower cover 26.

However, the lower flap is substantially modified. Said lower flap 27 is provided with an annular peripheral groove 28 extending between a surface 29 forming the carrier surface for the flap and an abutment surface 30.

The latter limits the maximum spacing between the washer 31 engaging the groove 28 and the carrier surface 29 when the flap 27 is in its open position.

Figure 3:
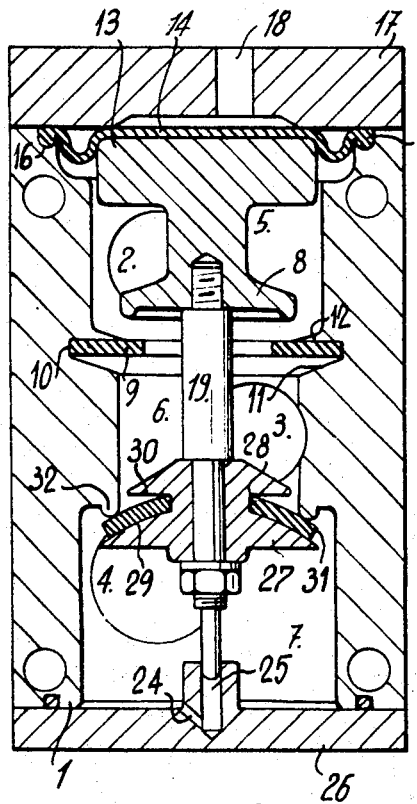
FIG. 3 illustrates a second embodiment of an improved valve with two flaps, of which one is in its closed position.

FIG. 3 shows the valve in the position for which the chambers 5 and 6 are interconnected, whereas the chamber 7 is closed. FIG. 4 shows the same valve when the movable member formed by the core 13, the rod 19 and the flap 27 occupy a medial position i.e. when said member has executed one half of the stroke required for passing from one extreme position into the other.

For said intermediate position, the packing constituted by the washer of elastic material 9 is in contacting relationship with the flap 8, while the packing formed by the washer 31 is still in contacting relationship with the seat 32 for the lower flap 27. Thus, no connection is then possible between the different chambers 5, 6 and 7. It is apparent that, in such a position, the washer 9 has already moved away from its abutment surface 12 whereas the washer 31 has not yet engaged the abutment surface 30 on the flap 27. This feature is due to the fact that the valve is executed in a manner such that the contact between a washer and the cooperating seat may continue during a portion of the stroke of the movable member which is slightly longer than one half of the complete stroke of said movable member. This provides an overlapping of the periods of closing of both flaps. Obviously, with a modification in the structure, for instance by increasing the spacing between the flaps 8 and 27, it is possible to cut out said overlapping of the closed periods and to obtain an overlapping of the open periods if required.

The second embodiment shows that it is possible without any further difficulty to secure the washer forming a fluidtight packing either on the stationary shell or on the movable member carrying the flaps. According to the applications, it may be of advantage to resort to one modus operandi rather than to the other or else the modus operandi may be different for the different flaps. Thus, in the case of FIGS. 3 and 4 an excellent fluidtightness is obtained for the intermediate position of the movable member, assuming the driving fluid enters the chamber 7 under pressure, while the chamber 6 is connected for instance with the chamber carrying the piston of a hydraulic engine and the chamber 5 is connected with the exhaust.

In this second embodiment, it should be noted that the pressure in the chamber 7 pushes the washer 31 against its seat 32, so that the pressure on this seat increases together with the pressure difference between the chambers 6 and 7. It is thus possible to obtain a very good fluidtightness between these chambers, while any superfluous stress on the washer 31 is avoided.

Obviously, the arrangement described may be applied without any further difficulty to more intricate valves showing a larger number of flaps adapted to be fitted on a common movable member.

Figure 4:
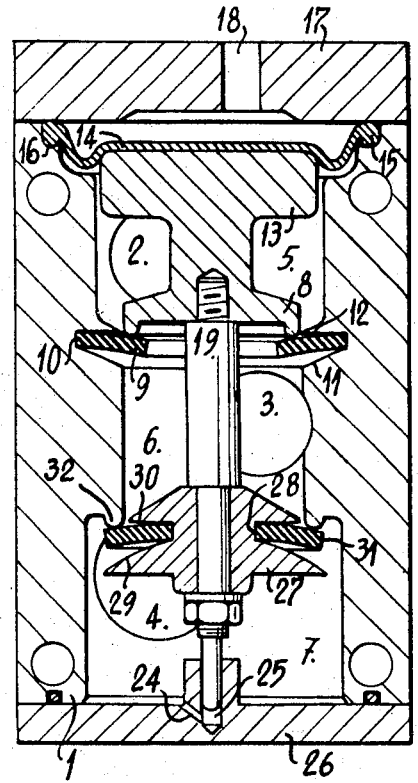
FIG. 4 illustrates the same valve as FIG. 3, both flaps being shown in an intermediate postiion.
Figure 5:
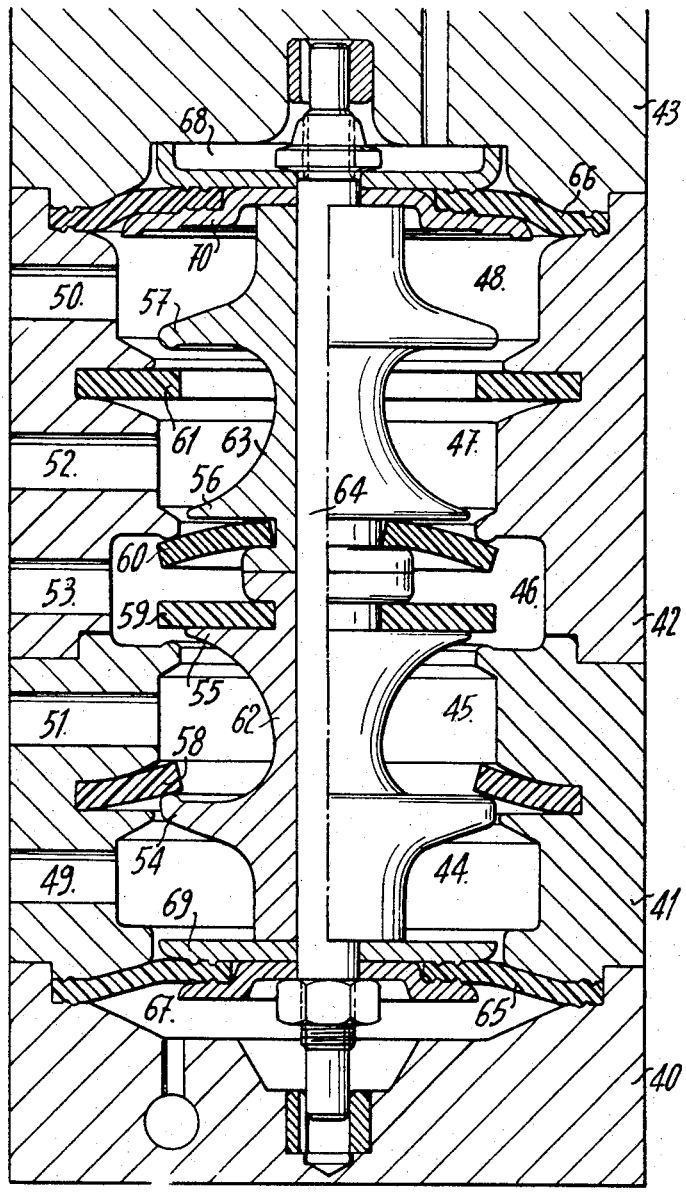
FIG. 5 illustrates the third embodiment.

FIG. 5 shows the embodiment of a four way valve, the constructive idea of which is similar to that shown in FIGS. 3 and 4. This valve comprises a body made of four parts 40, 41, 42 and 43, which define five chambers 44, 45, 46, 47 and 48.

The chambers 44 and 48 are connected to the escape by means of bores 9 and 50 of the parts 41 and 42. The chambers 45 and 47 are connected to two working chambers of a hydraulic or pneumatic motor through bores 51 and 52, while fluid under pressure is introduced in the chamber 46 through a bore 53 of the part 42.

The connections between these chambers are controlled by means of flaps 54 to 57 cooperating with annular diaphragms or washers 58 to 61. The outer periphery of the washers 68 to 61 is fitted in a corresponding groove of the part 41, respectively 42, in the same manner as that shown in FIGS. 3 and 4 with regards to washer 9. The washers 59 and 60 are respectively engaged in grooves of a movable member made of two pieces 62 and 63 assembled by means of a rod 64.

The displacements of the movable member are controlled by a fluid under pressure acting on diaphragms 65 and 66 attached to the ends of the rod 64 and forming a movable wall for two chambers 67 and 68 made in the parts 40 and 43. The chambers 67 is continuously connected to the source of fluid under pressure feeding the bore 53, while the chamber 68 may at will be connected to said source or to the outlet.

The pressure of the fluid in the chamber 67 acts on the washer 69 securing the diaphragm 65, while the pressure of the fluid in the chamber 68 acts on the washer 70 securing the diaphragm 66. Due to the fact that the washer 70 has a larger diameter than the washer 69, the movable member is shifted downwards with respect to FIG. 5, when fluid under pressure is admitted in chamber 68, as the pressure is identical in chambers 68 and 67. When the chamber 68 is connected to the outlet, the pressure prevailing in chamber 67 pushes the diaphragm 65 upwards.

Due to the resilient washers 58 to 61, the valve perfectly operates although it is not provided with the usual very precise regulating means for setting the relative positions of the flaps with respect to the seats after the different parts of the valve have been assembled.

Similarly, it is obvious that the intermediate parts constituted by elastomer washers may be replaced by elastically deformable metal washers, in which case a yielding packing is provided either on the seat or on the flap for cooperation with said metal washer with a view to ensuring fluidtightness.

I claim:

1. A flap valve comprising an elongated shell provided with at least one flap seat facing one longitudinal direction of the shell and at least one flap seat facing the opposite longitudinal direction and with communication ports to either side of each seat, a flap adapted to cooperate with each seat, an elongated member rigidly carrying the flaps and adapted to move longitudinally of the shell between a first position raising the flap cooperating with the first-mentioned seat off its seat and urging the flap cooperating with the last-mentioned seat into its closed position with reference to its seat and a second position urging the flap cooperating with the first-mentioned seat into its closed position with reference to its seat and raising the flap cooperating with the last-mentioned seat off its seat and a yielding washer extending between each seat and the cooperating flap and adapted to fluidtightly engage both said seat and flap as long as the movable member is near the position for which said flap engages the seat.

2. A flap valve as claimed in claim 1, wherein the outer periphery of at least one washer is fitted in the inner surface of the shell adjacent the corresponding seat and is adapted to be deformed when engaged by the cooperating flap urging it against said corresponding seat.

3. A flap valve as claimed in claim 1, wherein the inner periphery of at least one washer is fitted in the outer surface of the cooperating flap and is adapted to be deformed when urged by said cooperating flap against the corresponding seat.

4. A flap valve as claimed in claim 1, wherein at least one washer is adapted to fluidtightly engage the cooperating flap and seat throughout about the half of the travel of the movable member leading towards and away from the position urging said flap into its closed position.

5. A flap valve as claimed in claim 1, wherein at least one washer is adapted to engage fluidtightly the cooperating flap and seat throughout more than the half of the travel of the movable member leading towards and away from the position urging said flap into its closed position.

6. A flap valve as claimed in claim 1, wherein at least one washer is made of elastic material ensuring fluidtightness.

References Cited

UNITED STATES PATENTS 3,186,430   6/1965   Koutnik _____ 137—625.27 XR
3,294,120   12/1966   Ruchser _____ 137—627.5

FOREIGN PATENTS 501,018   1/1954   Italy.

M. CARY NELSON, *Primary Examiner.*

ROBERT J. MILLER, *Assistant Examiner.*